SIGNAL PROCESSING SYSTEM EMPLOYING REFERENCE-SIGNAL CONTROLLED-INTEGRATOR FOR INTEGRATING RESULTANT OF TWO SUMMING CIRCUITS HAVING COMPLEMENTARY INPUTS

Filed May 6, 1964

2 Sheets-Sheet 1

INVENTORS
MURRAY H. MOTT
ALBERT T. ROOME
CARL W. ERICKSON
BY
ATTORNEYS

SIGNAL PROCESSING SYSTEM EMPLOYING REFERENCE-SIGNAL CONTROLLED-INTEGRATOR FOR INTEGRATING RESULTANT OF TWO SUMMING CIRCUITS HAVING COMPLEMENTARY INPUTS

Filed May 6, 1964

INVENTORS
MURRAY H. MOTT
ALBERT T. ROOME
BY CARL W. ERICKSON
[signature]
ATTORNEYS United States Patent Office 3,316,492

Patented Apr. 25, 1967

3,316,492

SIGNAL PROCESSING SYSTEM EMPLOYING REFERENCE-SIGNAL CONTROLLED-INTEGRATOR FOR INTEGRATING RESULTANT OF TWO SUMMING-CIRCUITS HAVING COMPLEMENTARY INPUTS

Murray H. Mott, San Diego, Albert T. Roome, Escondido, and Carl W. Erickson, San Diego, Calif., assignors to the United States of America as represented by the Secretary of the Navy Filed May 6, 1964, Ser. No. 365,537
7 Claims. (Cl. 328—143)

The invention described herein may be manufactured and used by or for the Government of the United States of America for governmental purposes without the payment of any royalties thereon or therefor.

The present invention relates to a signal processing unit and more particularly, to a signal processing unit comprising an algebraic multiplier, integrator and readout.

The present unit is a component part of co-pending application Ser. No. 365,536, filed May 6, 1964 in the name of James L. Whitaker, entitled Digital Correlator.

An object of the present invention is to provide a signal processing unit which is practical and has a low unit cost.

Another object of the invention is to provide a signal processing unit which gives uniform performance and wherein adjustments are minimized or eliminated completely.

A further object of the invention is to provide a signal processing unit which is easily reproducable, has a wide dynamic range and has excellent long and short term stability.

An additional object of the present invention is to provide a signal processing unit which utilizes a novel method of multiplying signals algebraically.

Other objects and many of the attendant advantages of this invention will be readiy appreciated as the same becomes better understood by reference to the following detailed description when considered in connection with the accompanying drawings wherein.

Figure 1:
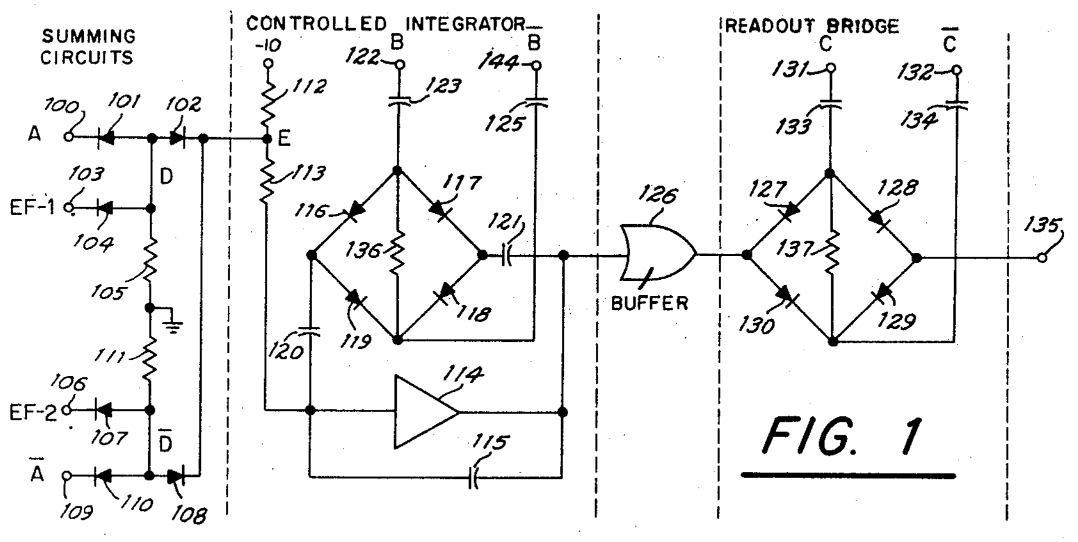
FIG. 1 is a simplified schematic of an embodiment of the invention.

In the embodiment of FIG. 1 an input 100 is coupled to the cathode element of a diode 101 which has its anode connected to the anode of another diode 102. Another input 103 is coupled to the cathode element of a diode 104 which has its anode connected to the anode of a diode 101. The anodes of diodes 101 and 104 are connected to ground through a current limiting resistor 105.

A further input is provided at 106 which is coupled to the cathode element of a diode 107 which has its anode connected to the anode of a diode 108. An additional input 109 is coupled to the cathode of a diode 110 which has its anode connected to the anode of diode 107 and also to the anode of diode 108. The anodes of diodes 107, 108 and 110 are connected to ground through another current limiting resistor 111.

Diodes 101 and 104 form one AND gate while diodes 107 and 110 form another AND gate which AND gates respectively feed into an OR gate comprising diodes 102 and 108.

The cathode elements of diodes 102 and 108 are connected together and coupled to a −10 volt source through a current limiting resistor 112. The common connection is also coupled to one side of a resistor 113 the other side of which is connected to the input of an operational amplifier 114. An integrating capacitor 115 is connected between the output and input of the operational amplifier 114. The operational amplifier, capacitor 115 and resistor 113 comprise an integrator.

The integrator comprising the operational amplifier 114, integrating capacitor 115 and resistance 113 is reset periodically by means of a reset bridge which is formed of diodes 116, 117, 118 and 119. The diodes are connected as follows: The anodes of diodes 116, 117 are connected in common; the cathodes of diodes 119 and 118 are connected in common; the cathode of diode 116 is connected to the anode of diode 119; and the cathode of diode 117 is connected to the anode of diode 118. The anode of diode 119 is coupled to the input of the operational amplifier 114 through an A.C. coupling capacitor 120 while the anode of diode 118 is connected to the output of the operational amplifier 114 through an A.C. coupling capacitor 121. Reset pulses are coupled in to the common anodes of diodes 116 and 117 from an input 122 through an A.C. coupling capacitor 123. The inverse of the reset pulse at 122 is coupled in to the common cathode of diodes 119 and 118 from input 124 through A.C. coupling capacitor 125. A resistor 136 is coupled from the common anodes of diodes 116, 117 to the common cathodes of diodes 118, 119.

The output of the integrator is coupled through a buffer 126 to a readout bridge comprising diodes 127, 128, 129 and 130. The diodes are connected as follows: The anodes of diodes 127 and 128 are connected in common; the cathodes of diodes 129 and 130 are connected in common; the cathode of diode 128 is connected to the anode of diode 129; and the cathode of diode 127 is connected to the anode of diode 130. A resistor 137 is connected from the common anodes of diodes 127, 128 to the common cathodes of diodes 129, 130. Readout pulses are coupled in at two inputs 131 and 132. The input at 132 is the inverse of the input of 131. Input 131 is connected through A.C. coupling capacitor 133 to the common anode connection of diodes 127 and 128. The inverse of the input of 131 is coupled in at input 132 through coupling capacitor 134 to the common cathode connection of diodes 129, 130.

An output is taken at output terminal 135 which is coupled to a terminating network which in turn is coupled to the output buss and is connected to the anode cathode common connection of diodes 129, 128.

The portion of the circuit comprising diodes 101, 104, 107, 110 which comprise two AND gates, respectively, and the OR gate consisting of diodes 102, 108 performs the equivalent of an algebraic multiplication on input signals coupled in at 103 and 106 inasmuch as the input signals impressed on the input terminals 103 and 106 are the inverse of each other. Accordingly, by performing an algebraic summation of the inverse signals the equivalent of multiplication operation is produced. Simultaneously an output from a reference shift register, not shown, is coupled in at 100 and 109 corresponding to waveform A and $\overline{A}$ of FIG. 2. The present algebraic multiplier deviates from standard AND gate terminology in that $A.B=C$ is not the requirement. The present circuit works because one value is at all times one, i.e. $1 \times B=C=B$. Further, the point E always takes the most negative state.

Figure 2:
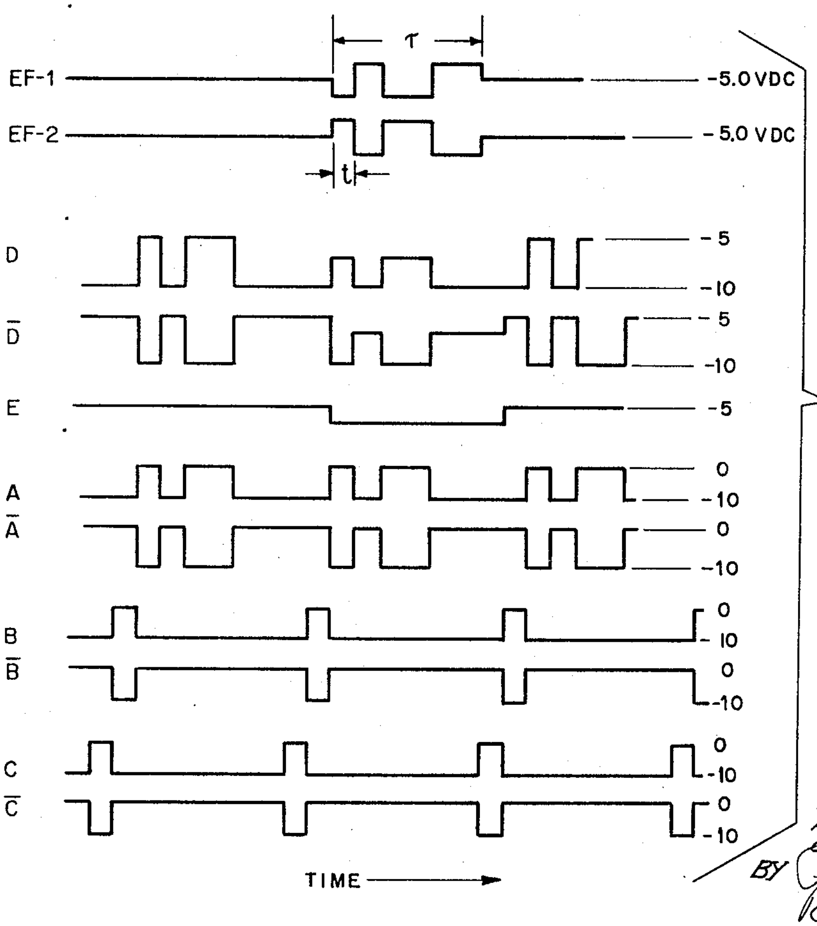
FIG. 2 is a diagram of waveforms at indicated points in FIG. 1.

FIG. 2 illustrates the waveforms at the indicated points in FIG. 1, i.e. the input waveform EF–1, EF–2 and the associated reference pulses from the shift registers which are coupled in at inputs 100 and 109 corresponding to A and $\overline{A}$. No explanation is made with reference to FIG. 1 in that the voltage levels are indicated at the various points in the diagram succinctly in FIG. 2 such that one can follow exactly what happens. The output of the OR gate, i.e. diodes 102 and 108 is the voltage level at point E which corresponds to the input of the integrator.

The requirement on the integrator is that there be an open circuit during integration so that one will have as close to pure capacity in the integrator as possible. This requirement must be satisfied in that any leakage deteriorates the waveform which is desired at the output. The operational amplifier in the present instance, is A.C. coupled from the bridge comprising diodes 116 through 119 in that in the present design a D.C. voltage level of 0 is not present at the input and output of the operational amplifier. In a conventional or standard operational amplifier the input voltage level and the output voltage level are adjusted to be 0. Another condition might arise where the D.C. levels on both sides of the integrating capacitor 115 are the same, however, this is just a modification of having the output and input voltage levels at the operational amplifier 114 zero. If the voltage level on both sides of the integrating capacitor is not the same there would be a charge on the capacitor and an offset would result and the zero reference would be lost. A.C. coupling is utilized between the reset inputs at 122 and 124 so that D.C. bias does not have to be applied to the bridge comprising diodes 116 through 119. Utilizing the A.C. coupling capacitors 120 and 121 thusly obviates having any D.C. applied to the input and output of operational amplifier 114. Ordinarily, in conventional operational amplifier techniques D.C. coupling is utilized.

Figure 3:
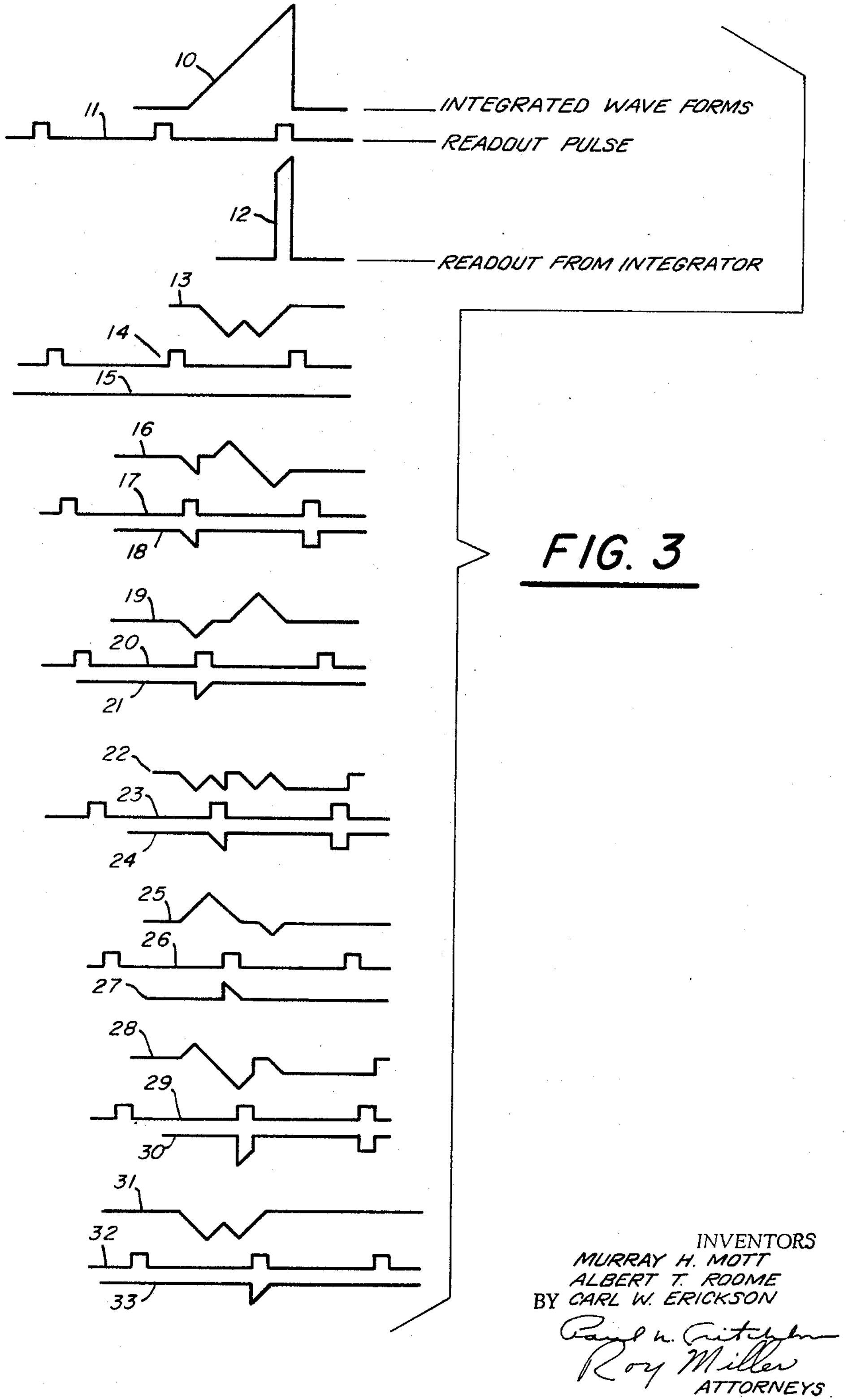
FIG. 3 is a diagram of waveforms correlating integrated waveforms and readout pulses with the final readout from a group of integrators as illustrative of the operation of the signal processing system of the present invention when the input multiple unit code signal is displaced at various time dispositions relative to the reference signal.

The readout bridge comprising diodes 127 to 130 is utilized in that a bipolar readout is desired as shown in FIG. 3 where a multiplicity of integrator outputs is shown. In addition, only the terminal portion of the integrated form is desired therefore, the output must drop to zero immediately after or as soon after the readout pulse is applied as possible.

This is accomplished through the use of the readout bridge, as shown. Again, A.C. coupling from inputs 131 and 132 is used as compared to conventional D.C. coupling to obviate applying any D.C. bias which would distort or modify the output of the integrator.

The resistors 136 and 137 across the two diode bridges 116–119 and cause the input signals to the bridges to be translated across the respective resistors to the opposite corners of the bridges and then read out. The resistors tend to make the bridges self-balancing and, depending on the duty cycle and input signal amplitude, the input signal is read out with low loss.

The bridges differ in operation in that the integrator bridge, diodes 116–119 short out the integrating capacitor 115 during the pulse interval while the readout bridge diodes 127–130 opens, i.e., passes the signal to the output 135 during the pulse interval.

A multiplicity of the circuits shown in FIG. 1 are utilized in Dicor, referred to in the co-pending application. Therefore, when readout is accomplished one wishes to avoid loading on any other bridges, i.e., no offset is desired which will modify or destroy the effective wave shape from the individual integrators. It is also desired to read the full amplitude of any output from the integrators.

*Operation*

In operation, the input signal at 103 and its inverse at 106 drive the algebraic AND gates whose outputs are connected to the OR gate comprising diodes 102 and 108. Algebraic multiplication is performed as shown in FIG. 2 between the input signal and the reference signals coupled in at inputs 100 and 109 corresponding to A and $\overline{A}$ respectively. The output of the OR gate at E is fed to the bipolar integrator 114, which is of the feedback operational amplifier type, and which utilizes the diode-bridge reset circuit comprising diodes 116–119. The output of the bipolar integrator 114 is coupled through the buffer emitter-follower 126 and then to the other diode bridge, comprising diodes 127 through 130, which samples and reads out the signal to the output buss.

FIG. 3 illustrates the operation of the signal processing system of the present invention in producing an output signal indicative of the coincidence of a multiple unit code signal, such as that illustrated at EF–1 and EF–2 in FIG. 2, relative to a repetitive reference signal, such as that illustrated at A and $\overline{A}$ of FIG. 2. In the illustration of FIG. 2, the multiple unit code signal of EF–1 and EF–2 is represented as being coincident in time with the reference signal A and $\overline{A}$.

Accordingly, an integrated waveform of the general character illustrated by waveform 10 of FIG. 3 is produced. When the readout pulse such as that illustrated at 11, samples the waveform 10 there is produced an output of the general character illustrated by waveform 12. Such an output indicates by its distinctive amplitude characteristic that the multiple unit input code is coincident in time with the reference signal. Thus, the disposition of the input signal relative to time can be precisely established as, for example, positive identification with a range bin in a radar system.

If, however, the input code is advanced relative to the reference signal by one time unit of a seven unit code signal such as, for example, may be employed in the form of a Barker code, the signal developed by the integrated portion of the signal processing system of the present invention will be substantially of the character of the waveform shown at 13 in FIG. 3. Accordingly, when readout pulses sample the integrated waveform 13 at the relative time illustrated by waveform 14, no output at all is produced so that the ultimate output from the signal processing system is substantially that shown by waveform 15.

In a similar manner, if the multiple unit input code signal is advanced one more time unit relative to the reference code, an integrated waveform of the character shown at waveform 16 will be produced; the readout sampling pulses as illustrated in the time disposition of waveform 17 will produce an output from the signal processing system of the character illustrated by waveform 18.

If the multiple unit input code signal is advanced yet another time unit relative to the reference code, an integrated waveform of the general character illustrated by waveform 19 will be developed by the signal processing system of the present invention, and when sampled by the readout pulse waveform disposed in time as illustrated by waveform 20, will produce an output waveform substantially of the configuration of waveform 21 in FIG. 3.

Assuming that the waveform of a seven unit input code signal is advanced yet another time unit relative to the reference waveform, an integrated waveform of the general character shown at waveform 22 of FIG. 3 will be developed in the signal processing system of the present invention. When the waveform 22 is sampled by the readout pulse waveform disposed in time as illustrated at 23, an output waveform of the general character of waveform 24 will be developed.

In a similar manner, when the multiple unit input code signal is advanced another time unit relative to the repetitive reference signal, an integrated waveform is generated substantially of the configuration shown by waveform 25 of FIG. 3. When the waveform 25 is sampled by the readout pulse waveform 26, an output waveform of the character shown at waveform 27 is developed.

In a like manner, when the multiple unit input code signal is advanced yet another unit of time relative to the repetitive reference signal, an integrated waveform of the character shown at waveform 28 is generated in the signal processing system of the present invention. Sampling at gated intervals by the readout pulse waveform disposed in time as illustrated by waveform 29 relative to the integrated waveform 28 produces an output waveform of the character shown at waveform 30.

For a multiple unit code signal that is advanced yet another unit of time relative to the repetitive reference signal, an integrated waveform of the type shown at waveform 31 of FIG. 3 is developed in accordance with the operation of the signal processing system of the present invention. The sampling readout pulses disposed as shown at waveform 23 relative to waveform 31 produce an output waveform of the character shown at waveform 33 of FIG. 3.

Thus, when a seven element or seven unit code signal, such as the Barker code is received as the input signal, it is possible for the input code signal to be disposed substantially in seven different time relationships relative to a reference signal which comprises the same seven element multiple unit code cyclically repeating itself between redundant units that effectively mark the beginning and end of each repetitive code signal. These seven distinct time dispositions of the coded input signal relative to the reference signal are in addition to the time disposition where the input code is substantially coincident with the reference code. The operation of the signal processing system of the present invention is illustrated by the waveforms of FIG. 3, the uppermost three waveforms 10, 11, and 12 illustrating the distinctive output produced by the signal processing system when the input multiple unit code signal is coincident with the reference signal. Each successive group of three waveforms illustrate the signal generated by the integrated portion of the signal processing system in the present invention, the time disposition of the readout sampling pulses relative to the integrated waveform, and the output waveform produced by such sampling, respectively.

The signal processing unit was designed to minimize maintenance and to provide uniformity of performance so that the integrity of the integrated waveform would be preserved at the common output buss. Also, adjustments were intended to be eliminated or minimized to the greatest extent possible. Low unit cost was a factor in arriving at the final design of the algebraic multiplication portion as well as the integrator and readout portions of the unit. The dynamic range of the signal processing unit is extremely wide and the long and short term stability desired is achieved. The present circuit design provides a unit which is easily reproduced and which gives uniform performance when the units are mass produced.

Obviously many modifications and variations of the present invention are possible in the light of the above teachings. It is therefore to be understood that within the scope of the appended claims the invention may be practiced otherwise than as specifically described.

What is claimed is:

1. A signal processing system for ascertaining the coincidence of a multiple unit code signal relative to a reference signal consisting of cyclically repetitive identical code signals linked by redundant code units comprising:

a first summing circuit arranged to accept said code signal and said reference signal;

a second summing circuit arranged to accept the inverse of said signal inverse and said reference signal;

an integrator circuit connected to receive the outputs of said summing circuits, said integrator circuit being operative to integrate its input for the duration of said reference signals; and an output circuit connected to receive the signal generated by the said integrator circuit, said output circuit being cyclically responsive to a signal code incident with the last unit of each repetitive code signal of said reference signal for producing on output commensurate with the amplitude of the output signal of said integrator circuit during each said last unit.

2. A signal processing system as claimed in claim 1 wherein said integrator circuit is reset by signals coincident in time with said redundant code units.

3. A signal processing system as claimed in claim 1 wherein said integrator is of the bipolar type.

4. A signal processing system as claimed in claim 3 wherein said integrator is of the feedback operational amplifier type.

5. A signal processing system as claimed in claim 2 wherein said integrator circuit is reset by a diode-bridge circuit responsive to said redundant code units.

6. A signal processing system as claimed in claim 1 wherein said summing circuits include two AND gates feeding into an OR gate connected to provide the input to said integrator.

7. A signal processing system as claimed in claim 1 wherein said summing circuit operates to algebraically sum said code signal and said signal inverse of said code signal whereby to produce an output substantially as a multiple of said code signal.

References Cited by the Examiner

UNITED STATES PATENTS

| | | | |
|---|---|---|---|
| 3,064,144 | 11/1962 | Hardy | 307—88.5 |
| 3,121,200 | 2/1964 | Samson | 328—143 |
| 3,130,325 | 4/1964 | Rubin et al. | 307—88.5 |
| 3,141,136 | 7/1964 | Pagano | 307—88.5 X |

ARTHUR GAUSS, *Primary Examiner.*

J. S. HEYMAN, *Assistant Examiner.*